(12) United States Patent
Peters et al.

(10) Patent No.: US 7,908,083 B2
(45) Date of Patent: Mar. 15, 2011

(54) SYSTEM AND METHOD FOR RECORDING A NOTE WITH LOCATION INFORMATION DERIVED FROM RANGEFINDING AND/OR OBSERVER POSITION

(75) Inventors: Victoria J. Peters, Vernonia, OR (US); Laura Goetsch, Whites Creek, TN (US)

(73) Assignee: Leupold & Stevens, Inc., Beaverton, OR (US)

( * ) Notice: Subject to any disclaimer, the term of this patent is extended or adjusted under 35 U.S.C. 154(b) by 1019 days.

(21) Appl. No.: 11/672,918

(22) Filed: Feb. 8, 2007

(65) Prior Publication Data

US 2008/0040036 A1 Feb. 14, 2008

Related U.S. Application Data

(60) Provisional application No. 60/771,687, filed on Feb. 8, 2006.

(51) Int. Cl.
*G01C 21/00* (2006.01)
(52) U.S. Cl. ............ 701/213; 701/300; 342/357.2; 342/357.25
(58) Field of Classification Search .......... 701/207–215, 701/224, 300, 302; 342/357.02, 357.03, 342/357.04, 118, 357.2–357.25; 434/1, 2, 434/11
See application file for complete search history.

(56) References Cited

U.S. PATENT DOCUMENTS

| | | | |
|---|---|---|---|
| 4,949,089 A | 8/1990 | Ruszkowski | |
| 5,506,588 A | 4/1996 | Diefes et al. | |
| 5,528,518 A | 6/1996 | Bradshaw et al. | |
| 5,579,165 A | 11/1996 | Michel et al. | |
| 5,801,866 A | 9/1998 | Chan et al. | |
| 5,861,994 A | 1/1999 | Kelly | |
| 5,923,294 A | 7/1999 | Bacelon et al. | |
| 5,952,959 A | 9/1999 | Norris | |
| 6,064,942 A * | 5/2000 | Johnson et al. ........ | 701/213 |
| 6,067,190 A | 5/2000 | Kelly | |
| 6,115,669 A | 9/2000 | Watanabe et al. | |
| 6,233,094 B1 | 5/2001 | Tsuda | |
| 6,490,521 B2 | 12/2002 | Wiener | |
| 6,850,188 B1 | 2/2005 | Lee et al. | |
| 6,862,525 B1 | 3/2005 | Beason et al. | |
| 6,871,144 B1 | 3/2005 | Lee | |
| 6,996,406 B2 | 2/2006 | Lection et al. | |
| 7,142,900 B1 | 11/2006 | Straub | |
| 2004/0036649 A1 | 2/2004 | Taylor | |

* cited by examiner

*Primary Examiner* — Richard M. Camby
(74) *Attorney, Agent, or Firm* — Stoel Rives LLP (57) ABSTRACT

A method and system to record a note regarding a target observed by an observer, determine a location of at least one of the observer or the target, and associate and store the note and the location. Optionally, the method and system further measure a distance between the observer and the target, measure a direction relating the observer and the target, and calculate, based on the location of the observer, the measured distance, and the measured direction a location of the target.

20 Claims, 5 Drawing Sheets

SYSTEM AND METHOD FOR RECORDING A NOTE WITH LOCATION INFORMATION DERIVED FROM RANGEFINDING AND/OR OBSERVER POSITION

RELATED APPLICATIONS

This application claims priority from U.S. Provisional Application No. 60/771,687 filed Feb. 8, 2006, which is hereby incorporated by reference in its entirety.

TECHNICAL FIELD

The field of the present disclosure is directed to a portable electronic navigation and communication device and method of operation thereof.

BACKGROUND

Portable navigation devices are well known, widely used, and are becoming increasingly popular. Navigation Satellite Timing and Ranging Global Positioning System (NAVSTAR GPS, commonly abbreviated as GPS) has become one standard of navigation and timing for myriad civilian and military applications. In particular, handheld and vehicle-mounted GPS units have the ability to determine their position and display maps, routes, and location information. The GPS units may further store one or more positions as navigational references or waypoints for later retrieval and routing.

In addition to providing an absolute Earth location (usually defined at least in terms of latitude, longitude, and altitude), a handheld GPS may further be coupled proximate a rangefinder to determine the position of a distant object. For example U.S. Pat. No. 4,949,089 to Ruszkowski, Jr. discloses a portable target locator system. In particular, the locator system includes a GPS receiver capable of determining the location coordinates of a target locator. A laser rangefinder and digital azimuth and inclination sensor proximate the target locator are then utilized to accurately determine the range, azimuth and inclination of an identified target from the target locator. The rangefinder information may then be processed in conjunction with the location coordinates of the target locator to generate location coordinates for the selected target. A similar system may be employed to collect data for a geographic information system (GIS) database. U.S. Pat. No. 5,528,518 to Bradshaw et al. further discloses that a user may locate an object and then may store objects, features, and attributes selected from a predefined data dictionary for the located object.

GPS units employing voice processing and voice synthesis are known for accepting verbal commands and providing audible output, for example, verbal driving or route instructions. For example, U.S. Pat. No. 6,490,521 to Wiener discloses a subscriber unit including a GPS mechanism to determine subscriber position information and a speech processing mechanism to receive destination information spoken by a subscriber. The subscriber unit transmits the subscriber position and destination information to the service provider, which gathers navigation information including a map and a route from the subscriber position to the specified destination. The service provider transmits the navigation information to the subscriber unit. The subscriber unit conveys the received navigation information to the subscriber via an output mechanism, such as a speech synthesis unit and/or a graphical display.

In addition to driving or route information, a GPS unit may more generally output audiovisual data. U.S. Pat. App. Pub. US 2004/0036649 A1 to Taylor discloses a portable information system that utilizes GPS data as a key to automatically retrieve audiovisual data from a database. For example, during a tour or journey, the portable information system may automatically identify and describe places of interest, landmarks, history of nearby buildings, or locate hotels, hospitals, shops, etc., within a radius from the portable information system. Audible menus and voice commands may allow the portable information system to be operated hand- and eyes-free.

GPS units interoperable with a radio, for example combination GPS/radio units are also known to communicate location information to another GPS/radio unit. U.S. Pat. No. 7,142,900 to Straub discloses a portable GPS/radio unit that communicates information over a wireless radio network with at least one other such GPS/radio unit to share each unit's location. Each GPS/radio unit includes a single, push-to-talk button that may be pressed to both transmit a voice communication and to initiate transmission of location data to other such units within radio range. Each GPS/radio unit may also include a polling function that requests location data from other GPS/radio units, an auxiliary coding system that codes or encrypts all transmitted data, and an emergency message feature that facilities the transmission and receipt of emergency messages.

Handheld and vehicle-mounted GPS units may also display location, waypoints, map information, and the like on graphical displays. For example, U.S. Pat. No. 5,952,959 to Norris discloses a system of GPS devices, each device including a graphical interface to display the relative positions of the GPS devices in relation to each other. Additionally, U.S. Pat. No. 6,850,188 discloses that the perspective or vantage point from which the location data and other information data is graphically displayed may be selected or changed by the user.

The present inventors have identified a need for an improved system and method to determine locations, navigate, and communicate location information.

SUMMARY

According to one embodiment, a method of operating a portable electronic device involves recording a note regarding a target observed by a human observer, determining a location of at least one of the human observer and the target, and storing the location such that the note and the location are associated. Optionally, an embodiment further includes measuring a distance between the human observer and the target, measuring a direction relating the human observer and the target, and calculating, based on the location of the human observer, the measured distance, and the measured direction a location of the target. The calculated location of the target may then be stored in association with the note.

According to another embodiment, a system comprises a note recorder, a GPS receiver, and a memory. The note recorder may be configured to record a note entered by a user regarding a target. The GPS receiver is configured to determine a location of the user. The memory stores the note and data regarding the location such that the note and data are associated. Optionally the system further comprises a rangefinder and a processor. The rangefinder is preferably configured to measure a distance and a direction between the user and the target. The processor, which is connected to the note recorder, the GPS receiver, the memory, and the rangefinder, may be configured to calculate a location of the target based on the location of the user, the measured distance, and the measured direction. In this case, the data regarding the location is the calculated location of the target.

According to another embodiment, the stored location of the target and/or the associated note may be communicated to other similar units or any other system or device that may receive the location of the target and the associated note.

According to still another embodiment, the recorded voice note may optionally be converted to text for storage and/or display.

Additional aspects and advantages will be apparent from the following detailed description of preferred embodiments, which proceeds with reference to the accompanying drawings.

DETAILED DESCRIPTION OF PREFERRED EMBODIMENTS

With reference to the above-listed drawings, this section describes particular embodiments and their detailed construction and operation. As one skilled in the art will appreciate, certain embodiments may be capable of achieving certain advantages over the known prior art, including but not limited to some or all of the following: (1) the ability to conveniently tag observations with location information and one or more notes; (2) improved location tagging accuracy of remote objects by a combination of observer location data and ranging information from the observer to the remote object; (3) the ability to store identification and location of objects such as storing a record of a bird species and its location; (4) the ability to store a photographic record that includes a voice note and to display the information in the case of a rangefinder with a camera behind the display (such a display could further include GPS coordinates, range, a scale sized to measure objects accurately, date, time, temperature, altitude, barometric pressure, incline angle, and/or compass bearing; and (5) the ability to communicate the location information and/or one or more notes. These and other advantages of various embodiments will be apparent upon reading the following.

Figure 1:
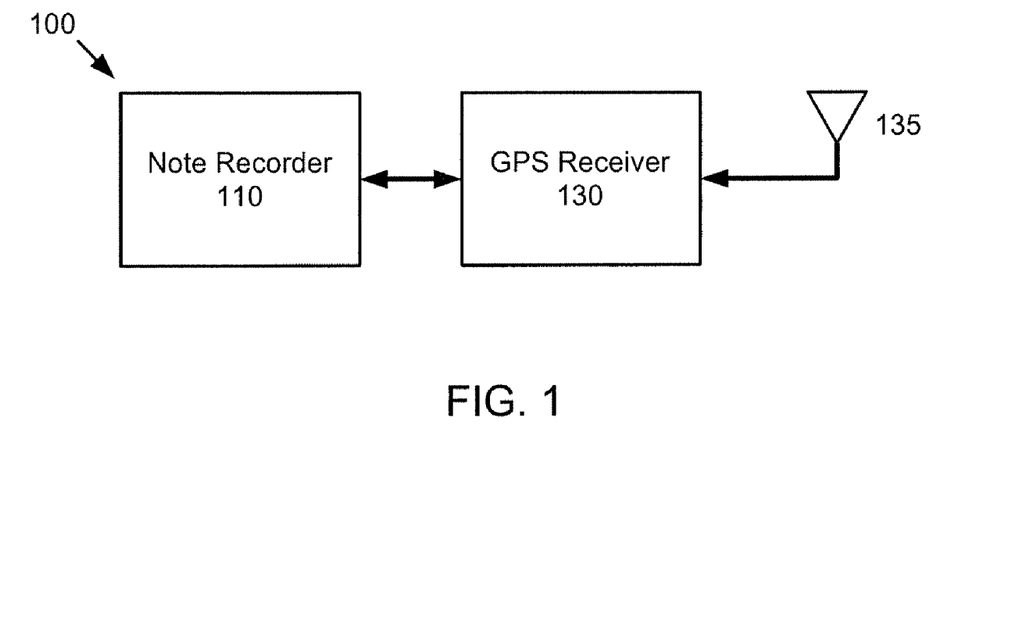
FIG. 1 is a simplified block diagram of a system according to one embodiment.

FIG. 1 is a simplified block diagram of a system 100 according to one embodiment. The system 100 comprises a note recorder 110 and a GPS receiver 130 coupled to a GPS antenna 135. The system 100 may have additional components not shown. The note recorder 110 functions to record a note entered by a user of the system 100. The note recorder 110 may electronically capture a note entered by any means, such as, for example, typing, writing (e.g., using a stylus), picture-taking, or speaking. Thus, the note recorder 110 may comprise, for example, a keyboard, buttons or other controls, touch screen, stylus with handwriting recognition capability, camera, or a voice recorder. Preferably the note recorder 110 comprises a voice recorder for recording a voice note. In an embodiment, the voice recorder may also convert a voice note to text with, for example, speech recognition capability.

The system 100 enables a user in the field to record a note regarding a target, which may be an animal or other wildlife, animal indicia (e.g., footprints, fur, dung, etc.), or other phenomena or objects of interest, and to associate locational information with that note and/or target. This is accomplished by combination and interaction of the functionalities of the note recorder 110 and the GPS receiver 130, which is capable of measuring the absolute Earth location of the system 100 by receiving at its antenna 135 three or more signals from GPS satellites. Any other position measuring device may be used in place of the GPS receiver 130, but a GPS receiver is presently preferred due to its accuracy, extensive geographic coverage, economy, and widespread commercial availability. The system 100 may be realized using commercially available off-the-shelf separate components configured to work together or may be designed as an integrated system. The system 100 or parts thereof may be realized by modification of existing devices, such as GPS receiver units having built-in two-way radio communication capabilities, such as the Rino® brand GPS receivers available from Garmin International Inc., Olathe, Kans. Such GPS units contain some of the basic building blocks of a voice recorder, including a microphone and associated audio circuitry.

One application of the system 100 is tracking animals or other wildlife for sporting or other purposes. For example, a hunter in the field during a reconnaissance or scouting expedition can utilize the system 100 to record notes regarding game he or she is hunting. Such notes may include a description of the sighted game (e.g., "four-point buck drinking from brook near rocky clearing before moving southeast") as well as the location of the sighting from the GPS receiver 100. This application will be explained in greater detail later in this disclosure. Other possible applications include surveillance, law enforcement, military, botanical, geological, geographical, and cartographical applications.

Figure 2:
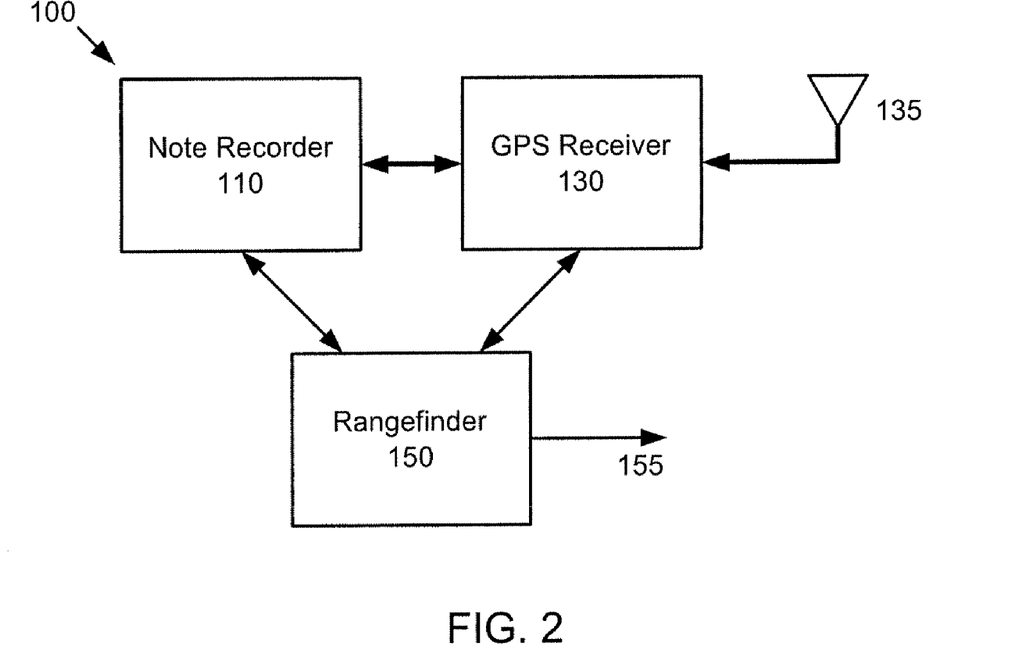
FIG. 2 is a simplified block diagram of a system according to another embodiment.

FIG. 2 is a block diagram of another embodiment of the system 100. In this embodiment, the system 100 also includes a rangefinder 150, which is a device that measures the distance to a target. The rangefinder 150 may operate according to any principle, such as, for example, sonar, radar, or laser reflectometry. Presently, use of a laser-based rangefinder is preferred for the rangefinder 150. A laser-based rangefinder typically emits laser pulses 155 to the target and detects reflections of those pulses 155. By measuring the time-of-flight between emission of one or more laser pulses and detection of their reflection, a range can be calculated. The rangefinder 150 may also preferably include an electronic compass to provide directional information, including compass bearing, and an inclinometer or tilt sensor to provide elevational inclination. Said alternatively, the electronic compass and inclinometer may determine the azimuth and altitude to the target. Based on the distance to the target and its direction from the observer, a positional offset can be determined. By combining this positional offset with the observer's location, as measured by the GPS receiver 130, a substantially precise geo-location of the target may be calculated.

The note recorder 110, the GPS receiver 130, electronic compass 132 inclinometer 134, and rangefinder 150 may be integrated together as a single device or configured as separate, discrete devices in communication with each other. In one version of the system 100, the note recorder 110 and the GPS receiver 130 are be housed together in one device while the rangefinder 150 is a separate device in communication with the other device via a wired or wireless connection. The rangefinder 150 may be part of a rifle scope.

In an alternative embodiment, the function of the rangefinder 150 can be provided by the user's interacting with a map of the local area displayed on a display (not shown) that is part of the system 100. In this embodiment, a local area map is displayed based on the GPS-measured location, and the user marks the location of the phenomenon, target, or object of interest on the map by pointing, clicking, etc. The marked location is then associated with a recorded note. Conversely, the user may know their position on the map and utilize the rangefinder to locate the phenomenon, target, or object of interest and associate the recorded note.

Figure 3:
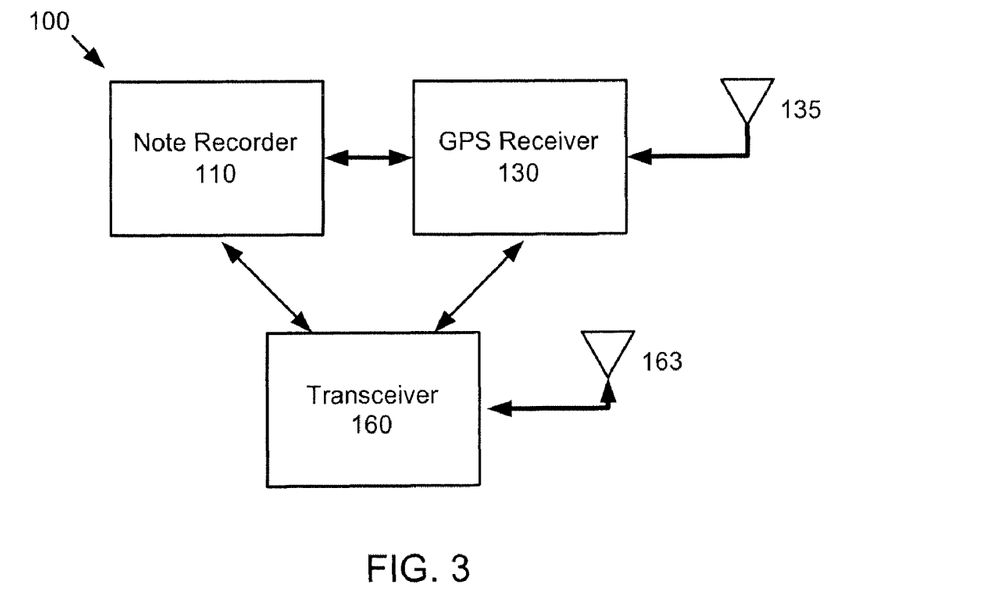
FIG. 3 is a simplified block diagram of the system of FIG. 1 including a transceiver.
Figure 4:
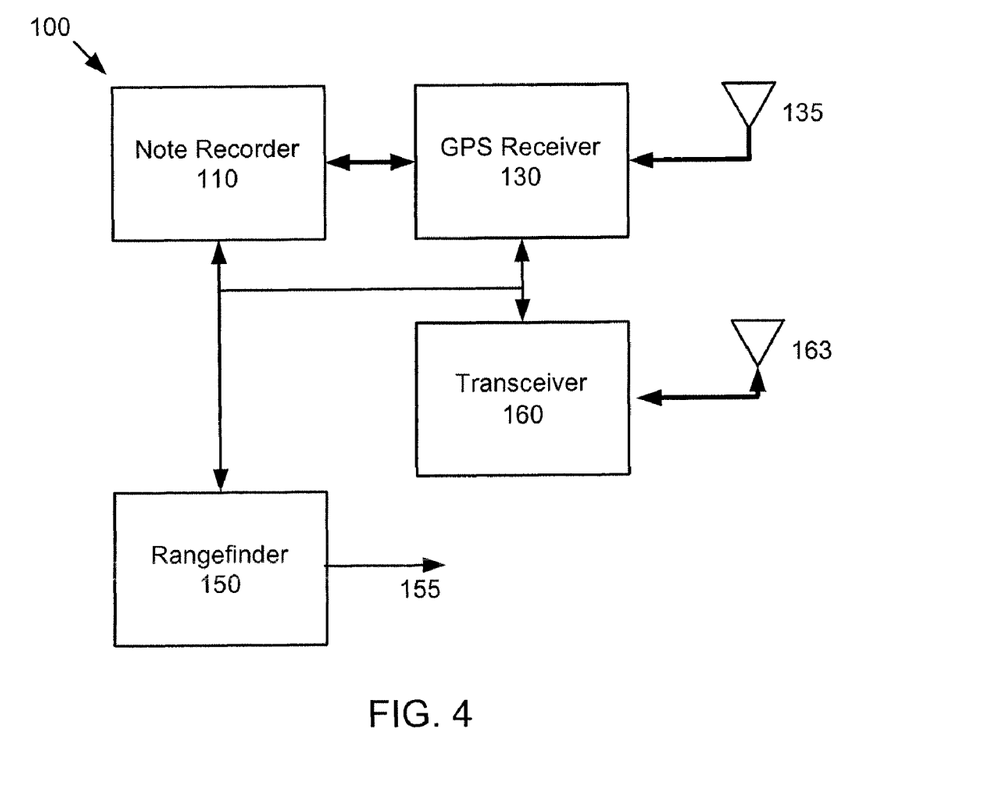
FIG. 4 is a simplified block diagram, of the system of FIG. 2 including a transceiver.

FIGS. 3 and 4 illustrate the system 100 of FIGS. 1 and 2 respectively including a transceiver 160 coupled to antenna 163. In addition to locating the user, the phenomenon, target, or object of interest and associating the recorded note, the system 100 may further communicate some or all of that information to another similar system 100 or to any other system or device that may receive the location of the phenomenon, target, or object of interest and the associated note. For example, in a hunting context, one hunter utilizing system 100 may locate an animal and communicate information related to the location of the animal and the associated note (e.g., "4 point buck," etc.) to a second hunter utilizing the same or similar system 100. In a law enforcement or military context, a soldier may locate a target with system 100 and communicate information related to the target location and the associated note (e.g., "stolen vehicle," "enemy bunker," etc.) to other similarly equipped soldiers, close air support elements, artillery elements, command and control elements, or any other law enforcement or military element. In such a manner, the system 100 of an embodiment may form part of the cooperative engagement capability (CEC) of a law enforcement or military unit. In an embodiment, the transceiver 160 may operate according to analog or digital radio communication methods or the like and may be coded or encrypted to limit or direct access to the target location and the associated note. Other communication methods may be used.

Figure 5:
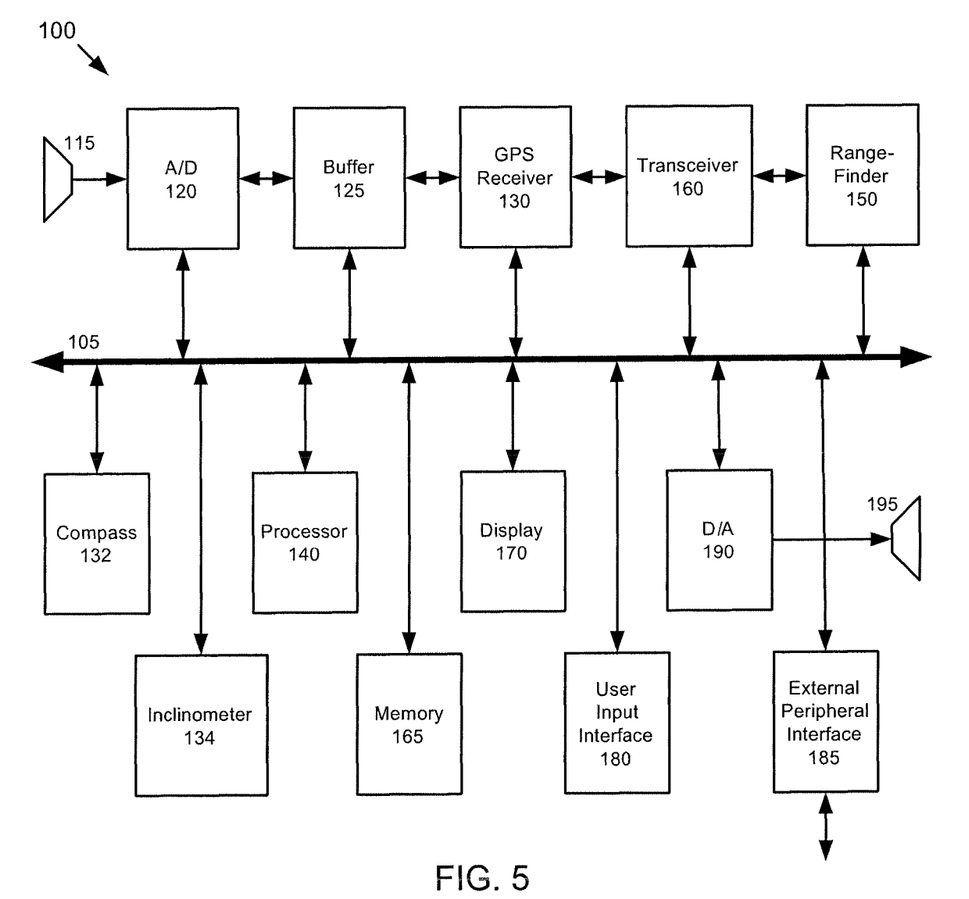
FIG. 5 is a block diagram of one illustrative architecture of the system of FIG. 4.

FIG. 5 depicts a more detailed block diagram of one illustrative architecture of the system 100. In FIG. 5, a bus-based architecture is illustrated, based on a bus 105. A number of other components interface to the bus 105, including an A/D (analog-to-digital) converter 120, a buffer 125, the GPS receiver 130, a processor 140, the rangefinder 150, a transceiver 160, a memory 165, a display 170, a user input interface 180, an external peripheral interface 185, a digital-to-analog (D/A) converter 190, and a speaker 195. Other versions of the system 100 may have less than all of these components and/or may contain other components.

As shown, the A/D converter 120, the buffer 125, and a microphone 115 work together as part of a voice recorder. Sounds sensed by the microphone 115 are transduced to an analog electrical signal as a function of time. That analog signal may undergo amplification, conditioning, or other preconversion processing (not shown) before being sampled and converted to digital form by the A/D converter 120 and stored in the buffer 125. The analog-to-digital converter 120 may include a sample-and-hold or track-and-hold circuit (not shown) to hold the output signal at discrete times as well as a quantizer (not shown) to convert the held values to digital representations. The processor 140, where all or most processing occurs, can read from the buffer 125 and may execute a voice compression algorithm to store a compressed form of the audio signal in the memory 165.

The processor 140 may be any form of processor and is preferably a digital processor, such as a general-purpose microprocessor or a digital signal processor (DSP), for example. The processor 140 may be readily programmable; hard-wired, such as an application specific integrated circuit (ASIC); or programmable under special circumstances, such as a programmable logic array (PLA) or field programmable gate array (FPGA), for example. Program memory for the processor 140 may be integrated within the processor 140, may be part of the memory 165, or may be an external memory.

The processor 140 executes one or more programs to control the operation of the other components, to transfer data between the other components, to associate data from the various components together (preferably in a suitable data structure), to perform calculations using the data, to otherwise manipulate the data, and to present results to the user in an interactive fashion. For example, the processor 140 may execute a speech-to-text conversion or speech recognition program to generate a text version of the recorded voice note.

The memory 165 may store compressed audio files (e.g., preferably compressed audio formats such as WMA, MP3, AAC, and the like), text versions of notes, programs executed on the processor 140, and other data (e.g., map graphic files). Data associated with a note is preferably stored in a data structure, which may be a record, table, or the like. One illustrative data structure for storing the note and associated location data comprises fields for (or pointers to) the compressed audio file that constitutes the note, any text version of the note, any graphic data associated with the note (such as when the rangefinder 150 has a camera capability), calculated location of the phenomenon, target, or object of interest, the data from which that calculated location was derived (e.g., user's GPS location, measured distance, and measured or entered direction), and date/time when the note was entered.

The display 170 can interface with the processor 140 and presents in textual and/or graphical form the results calculated by the processor 140. For example, the display 170 can show a date/time-ordered list of notes from which the user could select a note for listening and/or viewing a text version of the note. The display 170 may also display other information relating to the system 100, such as control or setup information. Some versions of the system 100 may not include the display 170 and may instead provide an interface to send data to another device, which may be a stand-alone display, printer, computer, or the like.

The user input interface 180 may interface to one or more user input devices, such as buttons, knobs, keyboard or keypad, pointing device, touch screen, or stylus, for example.

The external peripheral interface 185 allows for connection of external peripherals, such as another computer, a display screen, a printer, etc. The external peripheral interface 185 preferably provides an industry standard interface, such as a USB (universal serial bus) or Bluetooth™ radio-frequency interface, for example. The embodiments are not limited in this context. Any of the components illustrated in FIG. 5 as being directly connected to the bus 105 may instead be external peripherals connected via the external peripheral interface 185. For example, the rangefinder 150, rather than being directly connected to the internal bus 105, may be a separate external device connected via the external peripheral interface 185.

The D/A converter 190 and the speaker 195 enable a recorded audio note to be played out audibly. If the note is stored in compressed form, then an appropriate decompression algorithm is executed by the processor 140.

Figure 6:
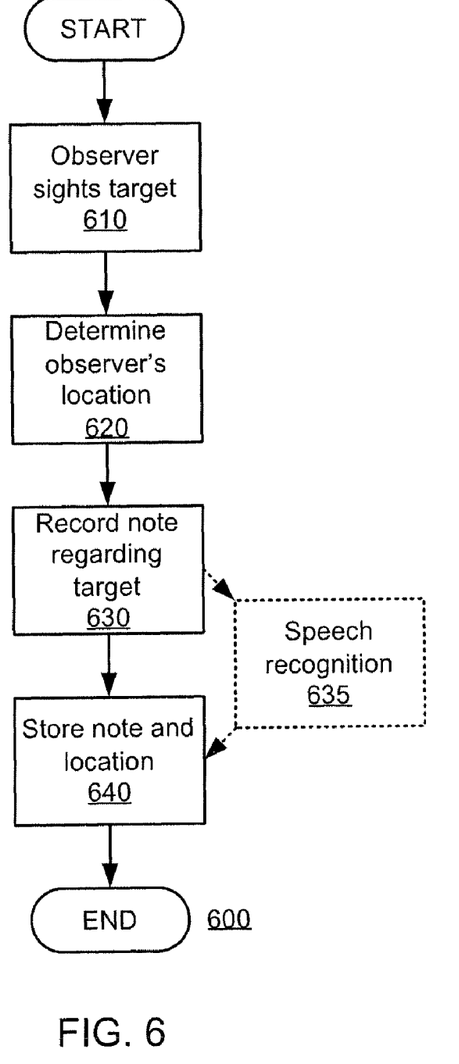
FIG. 6 is a flowchart of a method according to one embodiment.

FIG. 6 is a flowchart of a method 600 that may be preformed by or with the aid of the system 100, according to one embodiment. The method 600 begins when the user or observer sights (610) a target. The method 600 also determines (620) the observer's position, preferably by receiving and decoding a signals from GPS satellites. Thereafter, the observer records (630) a note regarding the target by an operation that initiates the recording step 630, such as depression of a "record" or "talk" button. Preferably, this note is a voice recording. In an embodiment, the voice recording optionally converted to text with, for example, a speech recognition process (635). Finally, the method 600 stores (640) the note and position in a way that associates one with the other and possibly with other related data (e.g., a date/time stamp when the note was recorded).

Figure 7:
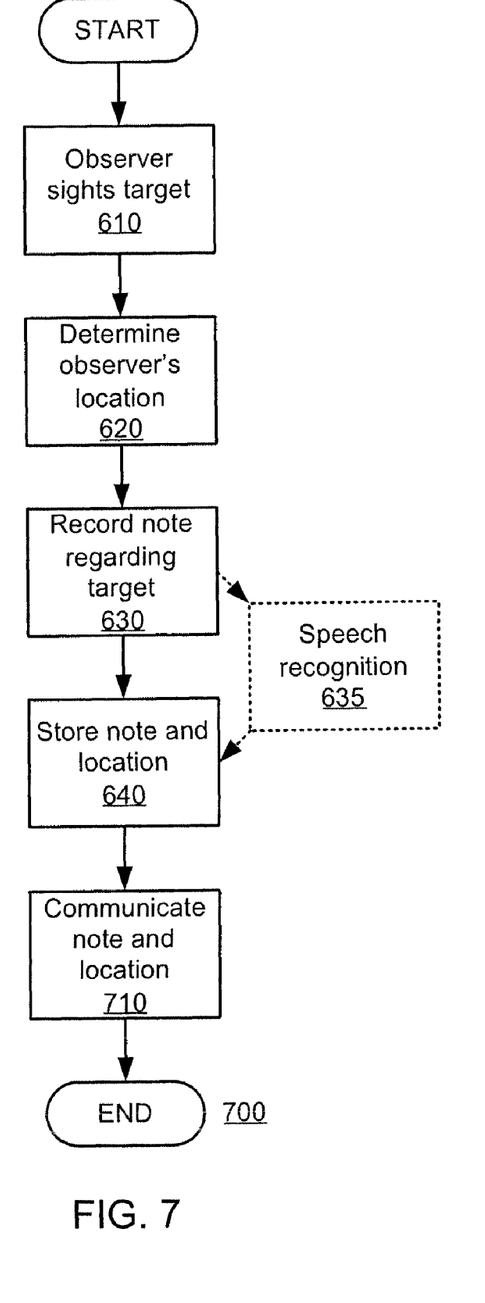
FIG. 7 is a flowchart of a method according to another embodiment.

FIG. 7 is a flowchart of a method 700 that substantially mirrors method 600. In addition to method 600, method 700 communicates (710) the note, position, and/or any other data to any system or device that may receive the data. In an embodiment the note, position, or any other data may be coded or encrypted to limit or direct access to the data.

Figure 8:
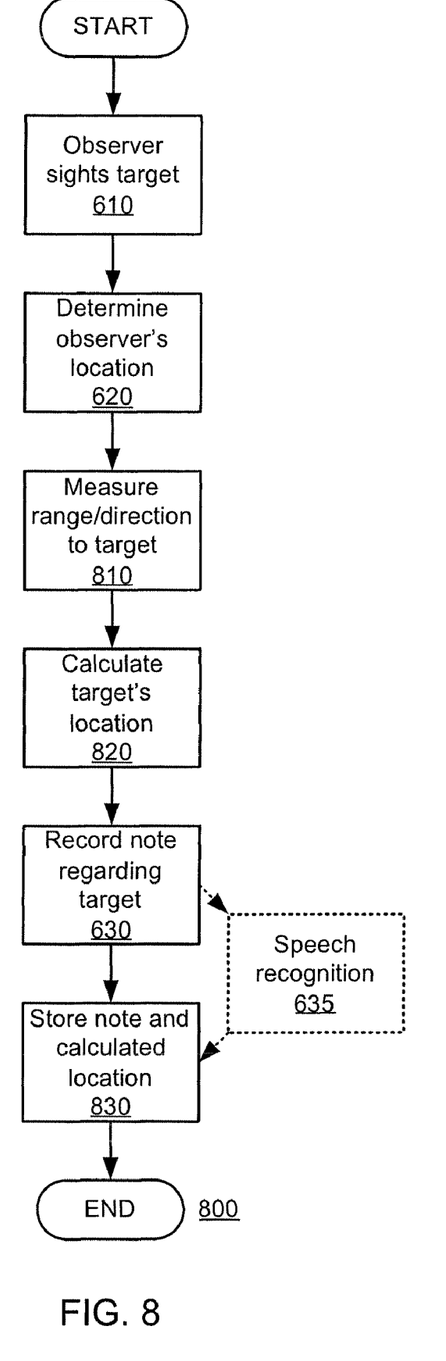
FIG. 8 is a flowchart of a method according to yet another embodiment.

FIG. 8 is a flowchart of another method 800 that may be performed by or with the aid of the system 100. Like the method 600, the method 800 begins when the user or observer sights a target (610) and determines (620) the observer's location. The method 800 additionally measures (810) a range/distance and direction from the observer to the target. In the measuring step the measurements of both distance and direction are preferably automated. Alternatively, one measurement (e.g., distance) may be automated while the other (e.g., direction) may be entered by the user. As yet another alternative, the user may determine both direction and range with the aid of a local area map displayed by the system 100. As yet another alternative, the user may determine both direction and range manually or by other means not electronically coupled to the system 100. The method 800 utilizes the measured range and direction (e.g., azimuth and altitude), however measured, in conjunction with the observer's location to calculate (820) the target's location. Thereafter, the observer records (630) a note regarding the target, and optionally converts voice to text with, for example, a speech recognition process (635). Finally, the method 800 stores (830) the note and the target's calculated location in a way that associates one with the other and possibly with other related data.

Figure 9:
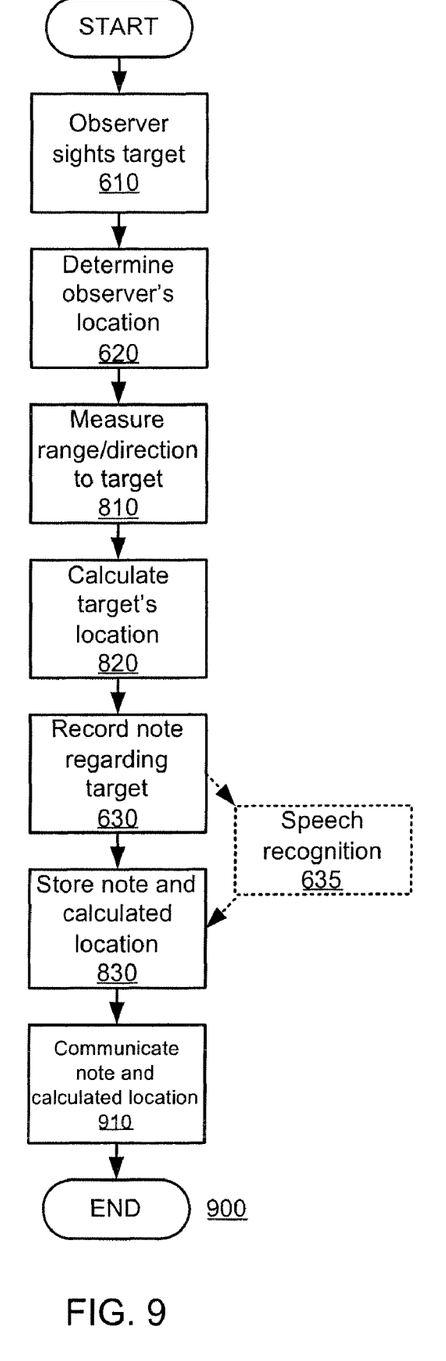
FIG. 9 is a flowchart of a method according to still another embodiment.

FIG. 9 is a flowchart of a method 900 that substantially mirrors method 800. In addition to method 800, method 900 communicates (910) the note, the target's calculated location, and/or any other data to any system or device that may receive the data. In an embodiment the note, the target's calculated location, or any other data may be coded or encrypted to limit or direct access to the data and may be transmitted wirelessly.

Though discussed with reference to the location of the observer or the location of the target, it is to be further understood that a voice note may be associated with a waypoint. For example, a voice note may contain detailed navigational instructions or an annotation associated with a particular waypoint. For example, a voice note may reference a real-world object (e.g., large boulder, fallen tree, road intersection, etc.) to supplement the bearing or track information provided by the GPS unit with a visual reference for a waypoint. Further, the voice note may be converted to text to, for example, label the waypoint on the display 170 without otherwise inputting a label for the waypoint.

After one or more location-tagged notes have been entered using the system 100, a user can retrieve the notes using the system 100. According to one note retrieval mode, the notes can be presented in chronological order, such as by a listing. According to another retrieval mode, notes within a given area around the system's 100 current location, as determined by the GPS receiver 150, can be marked on a displayed map of the current local area. The user can select the note's marking on the map to access the note. Alternatively, all notes within the given area can be listed chronologically, by order of proximity, or by some other order. In a further embodiment, a system 100 may retrieve notes that have been communicated by another system 100.

The algorithms for operating the methods and systems illustrated and described herein can exist in a variety of forms both active and inactive. For example, they can exist as one or more software or firmware programs comprised of program instructions in source code, object code, executable code or other formats. Any of the above can be embodied on a computer-readable medium, which include storage devices and signals, in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer-readable signals, whether modulated using a carrier or not, are signals that a computer system hosting or running a computer program can be configured to access, including signals downloaded through the Internet or other networks. Concrete examples of the foregoing include distribution of software on a CD ROM or via Internet download. In a sense, the Internet itself, as an abstract entity, is a computer-readable medium. The same is true of computer networks in general.

The terms and descriptions used herein are set forth by way of illustration only and are not meant as limitations. Those skilled in the art will recognize that many variations can be made to the details of the above-described embodiments without departing from the underlying principles of the invention. For example, the "target" about which a note is made may be a geological, geographical, botanical, cartographical, human, or social feature or condition. In the following listing of examples, all terms are to be understood in their broadest reasonable sense unless otherwise indicated, and equivalents of the examples' terms and elements are expressly reserved within the scope of this invention.

It will be obvious to those having skill in the art that many changes may be made to the details of the above-described embodiments without departing from the underlying principles of the invention. The scope of the present invention should, therefore, be determined only by the following claims.

The invention claimed is:

1. A method of operating a portable electronic device, the method comprising:
    recording via a note recorder in communication with the portable electronic device a note regarding a target observed by an observer, wherein the note comprises an observer-observed characteristic of the target;
    via the portable electronic device, determining a location of at least one of the observer or the target; and
    storing the location such that the note and the location are associated.

2. The method of claim 1, further comprising:
    measuring a distance between the observer and the target;
    measuring a direction relating the observer and the target;
    calculating, based on the location of the observer, the measured distance, and the measured direction, a location of the target; and
    wherein the storing step stores the calculated location of the target.

3. The method of claim 1, wherein the note recorder comprises a voice recorder and recording the note regarding the target comprises recording a voice note regarding the target.

4. The method of claim 3, further comprising:
    converting the voice note to text.

5. The method of claim 1, wherein determining the location of at least one of the observer or the target comprises receiving a GPS signal at or near the observer.

6. The method of claim 1, further comprising:
    wirelessly communicating at least one of the location of the observer, the location of the target, or the note to another portable electronic device.

7. A computer-readable medium on which are embedded program instructions for performing the method of claim 1.

8. A system comprising:
a note recorder configured to record a note regarding a target, the note entered by a user;
a portable GPS receiver configured to determine a location of the user; and
a memory in communication with the portable GPS receiver and the note recorder to store the note and data representing the location of the user such that the note and the data are associated.

9. The system of claim 8, further comprising:
a rangefinder configured to measure a distance and a direction between the user and the target; and
a processor coupled to the note recorder, the GPS receiver, the memory, and the rangefinder, the processor configured to calculate the location of the target based on the location of the user, the measured distance, and the measured direction.

10. The system of claim 8, further comprising:
a wireless transceiver to transmit to another system at least one of the location of the user, the location of the target, or the note.

11. The system of claim 8, further comprising:
a display configured to present an ordered list of user-selectable notes; and
a user input device configured to receive a user selection of one of the user-selectable notes from the list, wherein, in response to receiving the user selection of one of the user-selectable notes, the system is configured to present the user-selected note so that the user can listen to the note, view the note, or listen to and view the note.

12. The system of claim 8, further comprising:
a display configured to display a map of the local area around the user, wherein the system is configured to determine whether one or more location-tagged notes are within a predetermined distance of the location of the user as determined by the GPS receiver and if it is determined that one or more location-tagged notes are within a predetermined distance of the location of the user, the system is further configured to display on the map one or more of the location-tagged notes that are within the predetermined distance of the location of the user such that the user can select one or more of the displayed notes.

13. The system of claim 8, wherein the note recorder comprises a voice recorder configured to record a voice note, the voice recorder including a microphone and an analog-to-digital converter coupled to the microphone.

14. The system of claim 13, further comprising:
a speech-to-text converter configured to convert the voice note to a text note.

15. A system comprising:
a means for recording a note regarding a target observed by a human observer, wherein the note comprises an observer-observed characteristic of the target;
a means for determining a location of at least one of the human observer and the target; and
a means for storing the location such that the note and the location are associated.

16. The system of claim 15, further comprising:
a means for measuring a distance between the human observer and the target;
a means for measuring a direction relating the human observer and the target;
a means for calculating, based on the location of the human observer, the measured distance, and the measured direction, a location of the target; and
wherein the means for storing stores the calculated location of the target.

17. The system of claim 8, wherein the note comprises one of a comment about the target, an explanation regarding the target, an identification of the target, or a description of the target.

18. The system of claim 8, wherein the note recorder records the note regarding the target in response to receiving an indication that the user has depressed a button operatively coupled to the note recorder.

19. The system of claim 8, wherein the note recorder comprises a voice note recorder configured to record a user-observed voice note regarding a characteristic of the target and further comprising:
a rangefinder configured to measure a distance and a direction between the user and the target;
a display;
a user input device;
a speaker;
a transceiver configured to communicate with another system; and
a processor in communication with the voice note recorder, the GPS receiver, the memory, the rangefinder, the display, the user input device, and the transceiver, the processor configured to:
calculate the location of the target based on the location of the user as determined by the GPS receiver and the measured distance and the measured direction as determined by the rangefinder;
cause a compressed audio file constituting the voice note, date and time data regarding the date and time the voice note was entered by the user, and data representing the calculated location of the target to be stored in the memory such that the compressed audio file constituting the voice note, the date and time data, and the data representing the calculated location are associated with each other;
cause the display to present to the user an ordered list of user-selectable voice notes along with an indication of the date and time the voice notes were entered by the user;
in response to receiving via the user input device a user selection of one of the user-selectable voice notes, cause the speaker to present the selected voice note to the user so that the user can listen to the voice note; and
cause the transceiver to send the voice note to another system and to cause the transceiver to receive from another system a transmitted voice note comprising a user observed characteristic of an object.

20. The method of claim 1, further comprising:
receiving from another portable electronic device a transmitted note comprising a user-observed characteristic of an object;
displaying via a display in communication with the portable electronic device an ordered list of selectable notes, the ordered list including the transmitted note;
receiving from an input device in communication with the portable electronic device a selection of one of the selectable notes from the ordered list; and
in response to receiving the selection of one of the selectable notes, presenting the note to the observer so that the observer can listen to the note, view the note, or listen to and view the note.

\* \* \* \* \*